Nov. 25, 1924.　　　　　　　　　　　　　　　　1,516,613
F. J. MacDONALD
METHOD AND MACHINE FOR MAKING LAMINATED ARTICLES
Filed Oct. 7, 1921　　　5 Sheets-Sheet 1

Fig. 1

Inventor
F. J. MacDonald.
By Robert M. Pierson
Atty.

Nov. 25, 1924.

F. J. MacDONALD 1,516,613

METHOD AND MACHINE FOR MAKING LAMINATED ARTICLES

Filed Oct. 7, 1921

Inventor
F. J. MacDonald.
By Robert M Pierson
Atty.

Patented Nov. 25, 1924.

1,516,613

UNITED STATES PATENT OFFICE.

FRANK J. MacDONALD, OF AKRON, OHIO, ASSIGNOR TO THE B. F. GOODRICH COMPANY, OF NEW YORK, N. Y., A CORPORATION OF NEW YORK.

METHOD AND MACHINE FOR MAKING LAMINATED ARTICLES.

Application filed October 7, 1921. Serial No. 506,030.

*To all whom it may concern:*

Be it known that I, FRANK J. MACDONALD, a citizen of the United States, residing at Akron, in the county of Summit and State of Ohio, have invented a certain new and useful Method and Machine for Making Laminated Articles, of which the following is a specification.

This invention relates to means for making laminated articles of sheet material, and its particular object is to provide an automatic machine for forming lozenge-shaped reinforcing patches of rubberized fabric for use as reinforcements for pneumatic-tire tubes at the place where the inflating valve is located. My invention also provides certain improved mechanisms for use in a machine of this character or in any analogous situation.

The machine as herein illustrated supplies a foundation strip of rubber-frictioned fabric and intermittently feeds the same longitudinally by the reciprocation of a punch which perforates the laminated units. Upon this foundation strip are diagonally fed, in parallel, side by side, the ends of a pair of similar but narrower strips of vulcanized fabric whose spacing corresponds to the feeding stroke of the punch, the first of these diagonal strips being wider than the second, and the machine acting to cut off their ends on the bias and press down the pieces upon the foundation strip so that first one lozenge-shaped piece is laid on the foundation strip and then another smaller piece on top of that, to form a string of connected units which are finally cut off on the bias at the end of the foundation strip by a knife on the same cross-head as the two knives for the diagonal pieces, the cut-off units or patches being automatically assembled in a string of overlapped pieces on a convex table covered with card clothing.

All three strips are initially propelled by rollers which are automatically thrown out of gear if their rate of feed exceeds that of the posterior feeding devices. The latter device, in the case of each diagonal strip, consists of a slide provided with a feed-pawl, together with a stationarily-mounted check-pawl, which is automatically thrown out of action by an abnormal backward pull on the strip in case of a wrinkle or other obstruction being encountered in the latter which would tend to tear the strip on the check-pawl during the return stroke of the slide.

General features.

The frame of the machine includes a base 20 with a horizontal table 21 supported thereon by vertical rods or columns 22, 23. Mounted in bearings on the frame at the left-hand end is a power shaft 24 having fixed thereon a belt-pulley 25, a cam-wheel 26, and a sprocket-wheel 27. On the front of the wheel 26 is a cam-groove 28 which operates a roller on a stud 29, mounted on an upright lever 30, which is fulcrumed at 31 on the base 20, the upper end of this lever serving to reciprocate the punch-slide, and therethrough the slides for the diagonal strips. On the rear side of the wheel is a cam-groove 32, in which operates a roller 33 on the lower end of a cross-head 34 which is guided on the rods 23 at 35, 36, below and above the table 21, this cross-head carrying the punch and the three severing knives. At the right-hand end of the machine on bearings at the under side of the table 21 is mounted a horizontal shaft 37 (Fig. 2), having a sprocket 38 on its rear end, driven by a chain 39 from the sprocket 27, this shaft furnishing power to the propelling rollers for the three fabric strips.

Strip propeller.

Figures 10, 11:
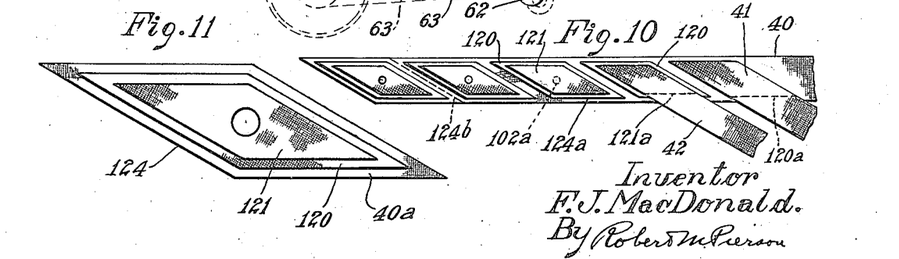
Fig. 10 is a plan view which illustrates the plying up of the transverse strips upon the foundation strip.
Fig. 11 is a plan view on a larger scale, showing the completed fabric patch.
Figure 15:
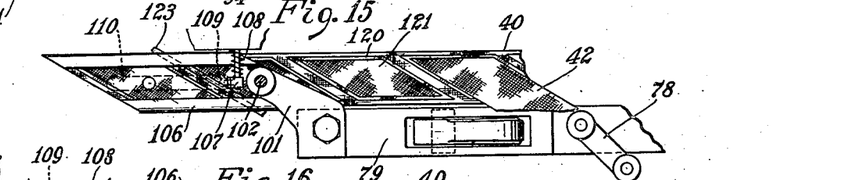
Fig. 15 is a plan view of the plied-strip punch and feeder and adjacent parts, with the feeder-slide and punch in their advanced position.
Figure 16:
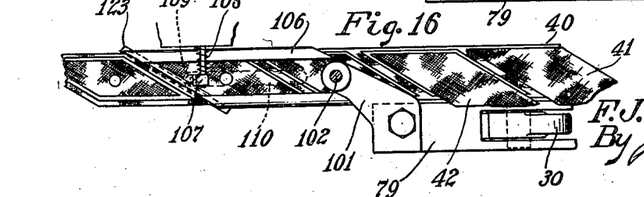
Fig. 16 is a plan view of the same parts with the slide and punch in their retracted position.

40 (Figs. 10, 15 and 16) is the foundation or carrier strip, and 41, 42 are the diagonally-fed over-ply strips, the strip 41 being wider than the strip 42. The foundation strip is fed from a loosely-mounted roll 43 (Fig. 1) and the strips 41, 42 from similar rolls 44, 45, the roll 43 being mounted on standards 46, and the rolls 44, 45 on standards 47 on the table 21, the three strips passing downwardly from their rolls over respective guide-rollers 48, 49, 50 (Fig. 2), loosely journaled in slots in the table.

The shaft 37 carries a gear 51 (Fig. 2), for driving a roller 51a which initially propels the foundation strip; and said shaft, through a pair of bevel gears 52, 53, drives a shaft 54 carrying a pair of gears 55 for driving similar rollers for propelling the strips 41, 42, as will presently be described.

Figure 8:
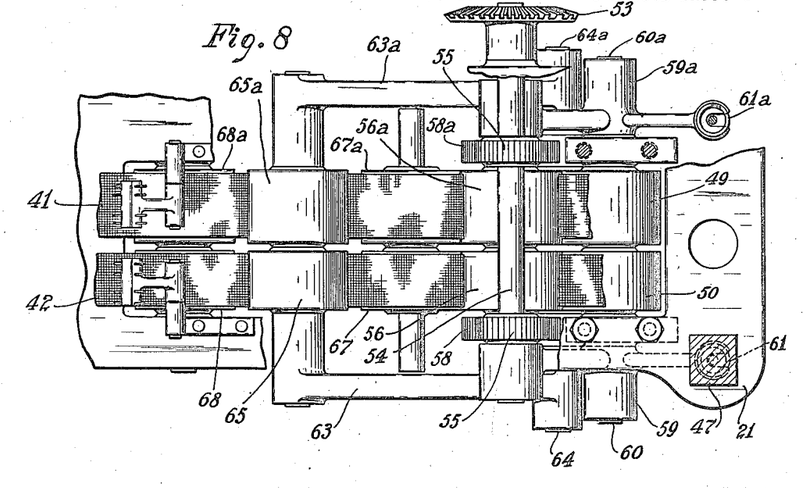
Fig. 8 is a plan view showing parts under the frame for controlling the feed of the transverse fabric strips.
Figure 9:
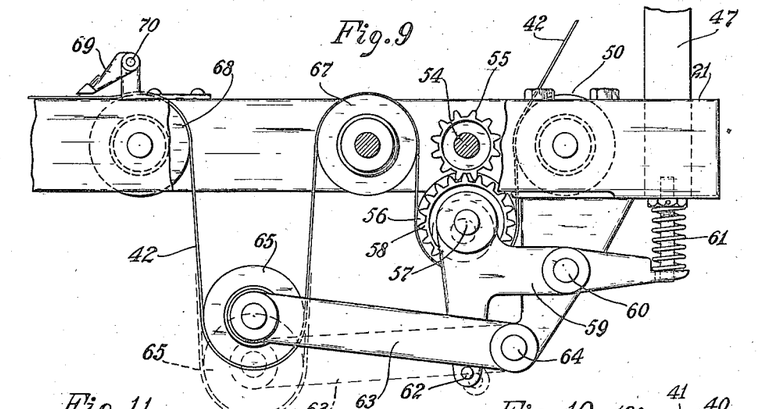
Fig. 9 is a side elevation, partly broken away and in section, of the parts shown in Fig. 8.

The latter strip-propelling rollers and their controlling mechanism are shown in Figs. 8 and 9, and as similar parts are provided for the foundation strip, a description of one will suffice for both. 56, for example, is a propelling roller for the strip 42, fixed to a stub shaft 57 on which is also fixed a gear 58 meshing with one of the gears 55 on the lower side of the latter, said shaft 57 being mounted in a bearing on a rock-lever 59 fulcrumed on the frame at 60 and having an arm engaged by a spring 61 which normally holds the gears 55, 58 in meshed relation. Another arm of said lever carries a pin 62 underlying an arm 63, which is pivoted on the frame at 64 and which carries at its forward end a loosely-journaled feeler-roller 65, suspended by a loop of the strip 42 formed between two loosely-journaled guide-rollers 67, 68 mounted in series on the frame. Similar parts for the strip 41 are designated by like numerals having the exponent "a".

69, 69 are needle-pointed check-pawls pivoted at 70, 70 on suitable frame brackets and resting by gravity on the upper surfaces of the strips 41 and 42 for preventing the retraction of such strips during the return strokes of the reciprocating feeders hereinafter described. 71 (Figs. 1 and 2) is a similar check-pawl pivoted at 72 on a frame bracket for operating on the foundation strip 40. 171 (Figs. 2 and 3) is an adjustably-tensioned, leaf-spring presser mounted in front of the pawl 71 for exerting a tension on the foundation strip. 73 is the feeler-roller, and 74, 75 are guide-rollers for the foundation strip, similar to the rollers 65, 67 and 68 for the diagonally-fed strips.

It will be evident that as long as the reciprocating feeder for any one of the strips is operating normally, the tension on the loop of fabric in which the feeler-roller is suspended will, by reason of a properly selected ratio between the length of stroke of the reciprocating feeders and the peripheral speed of the propelling roller such as 56, be such as to maintain the feeler-arm 63 in a field of oscillation above the pin 62, but should the action of the reciprocating feeders stop for any cause, the loop will, by reason of continued action of the propelling roller, elongate sufficiently to drop the feeler and its arm to the broken-line position indicated in Fig. 9, and thus pull the gear 58 out of mesh with the driving gear such as 55 or 51, thereby arresting the propelling roller until the action of the reciprocating feeders is resumed.

Diagonal strip feeders.

In suitable guide-slots 76 formed in the table 21 (Figs. 2, 5, 12 and 13) are mounted slides 77 which are reciprocated through the medium of pivoted links 78 from the slide 79 which imparts the feeding movement to the punch hereinafter described. To the upper side of each slide 77 is attached a slot-covering plate 80 and a flat, tubular fabric-guide 81 whose rear portion is formed with bracket flanges 82 on which are pivoted at 83 the rear ends of a pair of feed-pawls 84 having needles 85 at their forward ends for engaging the strip 41 or 42 through slots 86 in the strip-guide 81. When the slide is moved in a forward direction, the pawls carry the strip with them and during the return movement they are drawn back over the surface of the strip.

Figure 12:
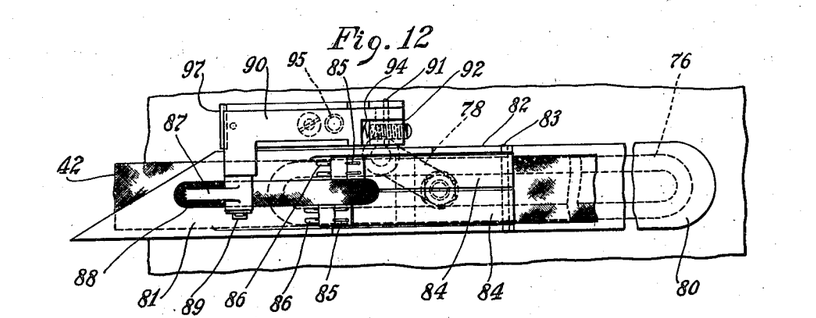
Fig. 12 is a plan view showing one of the transverse fabric strips, together with its feeder and retaining-pawl mechanism.
Figure 13:
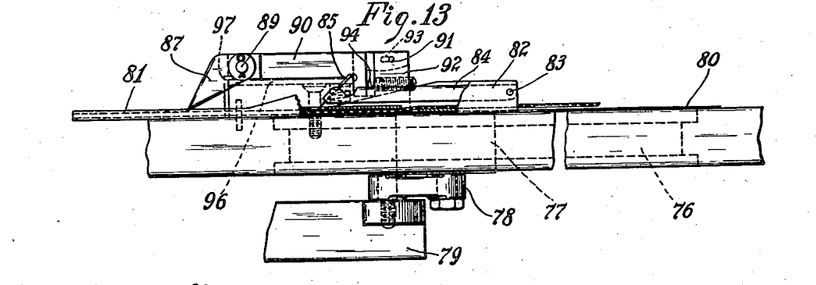
Fig. 13 is a side elevation, partly broken away, of the parts shown in Fig. 12.
Figure 14:
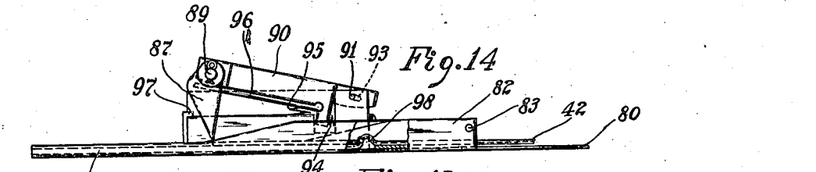
Fig. 14 is a view of parts shown in Fig. 13, illustrating the released position of the retaining pawl.

In order to prevent the strip from being dragged backward during the return movement of the slide, I provide a stationarily-mounted check-pawl 87 resting by gravity on the surface of the strip, the nose of said pawl engaging the strip through a slot 88 in the guide 81 and its rear end being pivoted at 89 (as best seen in Figs. 12 and 13) to the forward end of a block or pawl-carrier 90 which has a limited, longitudinal sliding movement and also a pivotal movement on a pin 91 attached to a fixed bracket 92 and occupying a slot 93 in the rear end of the block. A spring 94 urges the block in a forward direction and another spring 95 tends to swing it upwardly on its pivot. Mounted on the under side of the block 90 is a latch-plate 96 whose front end is normally lodged under the lip of a fixed keeper-plate 97 and the spring 94 tends to keep the block in this position so that the pawl 87 may exert its checking action on the fabric strip. Should a buckle or wrinkle 98 (Fig. 14) be formed in the strip during the rearward stroke of the feeder slide or should any other obstruction such as a thick splice be encountered, the tendency would be for the strip-guide 81 to pull the strip rearwardly and thus tear it against the teeth of the check-pawl 87 if the latter's pivot were rigidly mounted, but with the construction here shown when such event occurs the abnormal rearward thrust on the check-pawl 87 communicated to the block 90 draws the end of the latch-plate 96 out from under the lip of the keeper-plate 97 and the spring 95 then throws the block upwardly on its pivot to the position shown in Fig. 14 so that the check-pawl may swing on either side of a vertical position and thereby avoid damage to the fabric strip.

*Foundation strip feeder and punch.*

Figure 1:
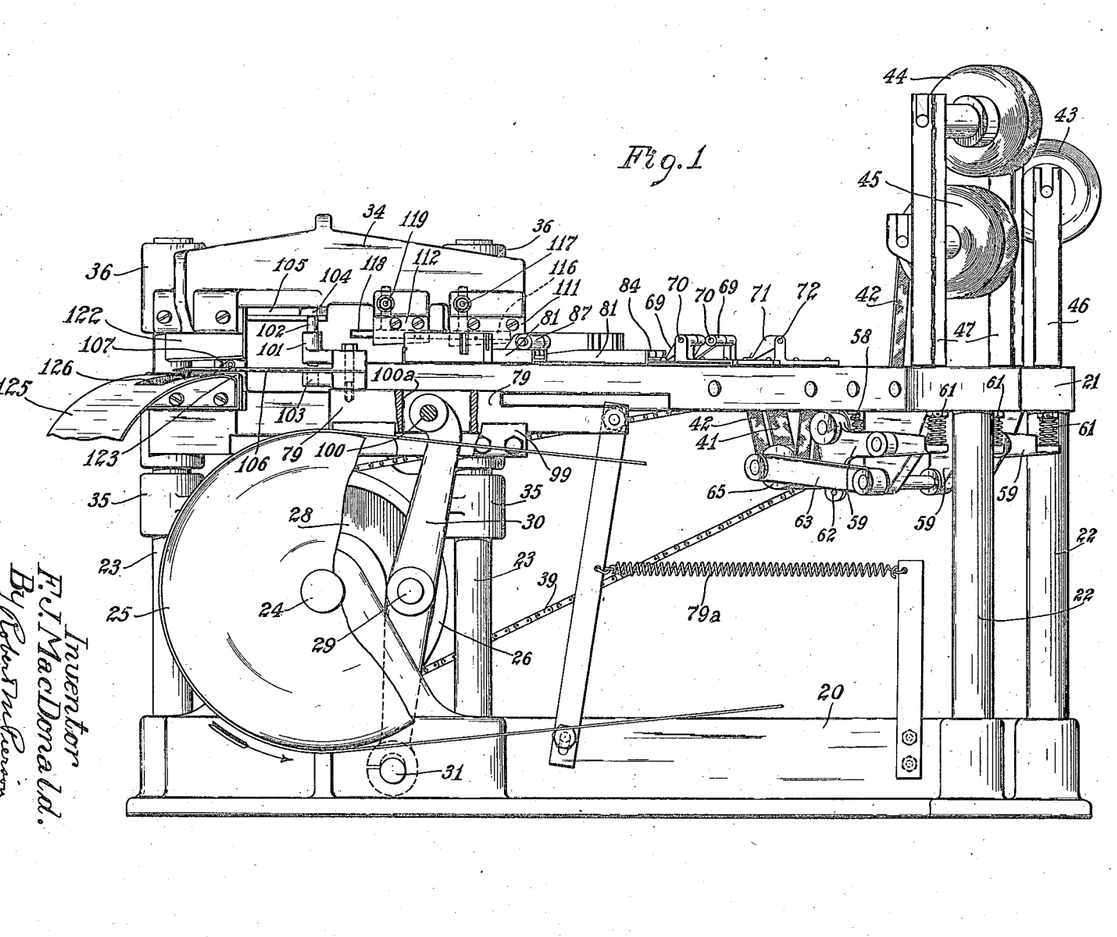
Fig. 1 is a side elevation, partly broken away and in section, showing a valve-patch-making machine constructed according to my invention.

The punch-feeding slide 79 is mounted to reciprocate in a guide 99 (Figs. 1, 2 and 5) at the forward end of the frame and is operated by the lever 30, the upper end of which is pivoted to said slide at 100, within a slot 100ª in said slide. 79ª is a pull spring having suitable connections as shown in Fig. 1 constantly to pull backward upon the slide 79, thus keeping the roller on the stud 29 of the lever 30 in contact with the outer wall of its cam groove 28, and thereby preventing lost-motion irregularities in the movement of said slide. The slide 79 has a guide-bracket 101 at its forward end formed with a vertical guide, and a cylindrical punch 102 is slidably mounted in said guide, its lower end being adapted to move into and out of a complemental aperture in a die-plate 103 also carried by the slide. Vertical reciprocation is imparted to the punch 102 from the cross-head 34 through a flanged head 104 on said punch occupying a groove 105 in the cross-head, which permits a horizontal movement of the punch relatively to said cross-head but prevents a relative vertical movement. The parts are timed so that the cross-head 34 descends when the slide 79 is in its rearward position (indicated in Figs. 1, 2 and 16), which forces the punch through the rearmost patch unit on the plied strip to form the valve hole in said strip, and during the ensuing forward reciprocation of slide 79 to the position shown in Figs. 5 and 15, the punch remains in the work and imparts a forward feeding movement to the latter, said punch being then withdrawn upwardly out of the work by the ascent of the cross-head, and the operation repeated. The slide 79 carries a semi-tubular, flat strip-guide 106 for supporting the forward end of the plied strip, and on the frame of the machine there is pivoted a needle check-pawl 107, held against the strip by a spring 108 (Figs. 15 and 16), there being a fixed pawl-rest 109 underlying the strip beneath the points of the pawl and occupying a slot 110 in the strip-guide 106.

*Cutting, pressing and delivering devices.*

Mounted on the cross-head 34 are spring-backed, vertical knives 111, 112 (Figs. 1, 2, 5 and 6), having inclined lower shearing edges coacting with fixed cutting plates 113, 114 (Fig. 6) mounted on the table 21, said vertical knives being mounted over the front margin of the guide-way 115 for the foundation strip and the knife 112 being offset from 111 toward the middle line of said guideway. Located in advance of the knife 111, in the direction of feed of the first diagonal strip, is a lozenge-shaped presser-foot 116 having a vertical stem adjustably fixed to the cross-head 34 by a set-screw 117 and in a corresponding position with reference to the knife 112 is a smaller lozenge-shaped presser-foot 118, whose vertical stem is adjustably fixed to the cross-head by a set-screw 119. The forward ends of the strip-feeder guides 81 are slanted to the line of feed of the diagonal strips parallel to the line of feed of the foundation strip, and are brought close to the knives 111, 112 at the forward end of the feeding stroke of said guides. The descent of the cross-head when the guides are in this position causes the knives 111, 112 to cut off from the end of each of the diagonally-fed strips 41, 42 a lozenge-shaped piece 120 or 121 (Figs. 10 and 11), and the further descent of the cross-head brings the presser feet 116, 118 against these cut off pieces so as to press them on the underlying fabric, against an inset, rubber pad (not shown) mounted in the table 21 and underlying said presser feet.

The forward end of the guide 106 for the foundation strip 40 is slanted in a direction parallel to the line of feed of the diagonally-fed strips, and at the end of the back stroke of said guide its forward end is brought just back of the position of a vertical knife 122 carried by the cross-head and having an inclined, shearing, lower edge coacting with a fixed vertical knife 123 mounted on the frame under the path of the plied strip. The descent of the cross-head when the strip-guide 106 is in this retracted position causes the knife 122 to shear off the projecting end of the plied strip indicated in Fig. 16, thus severing from said strip the finished valve patch represented as a whole by 124 in Fig. 11.

Figures 2, 3, 4:
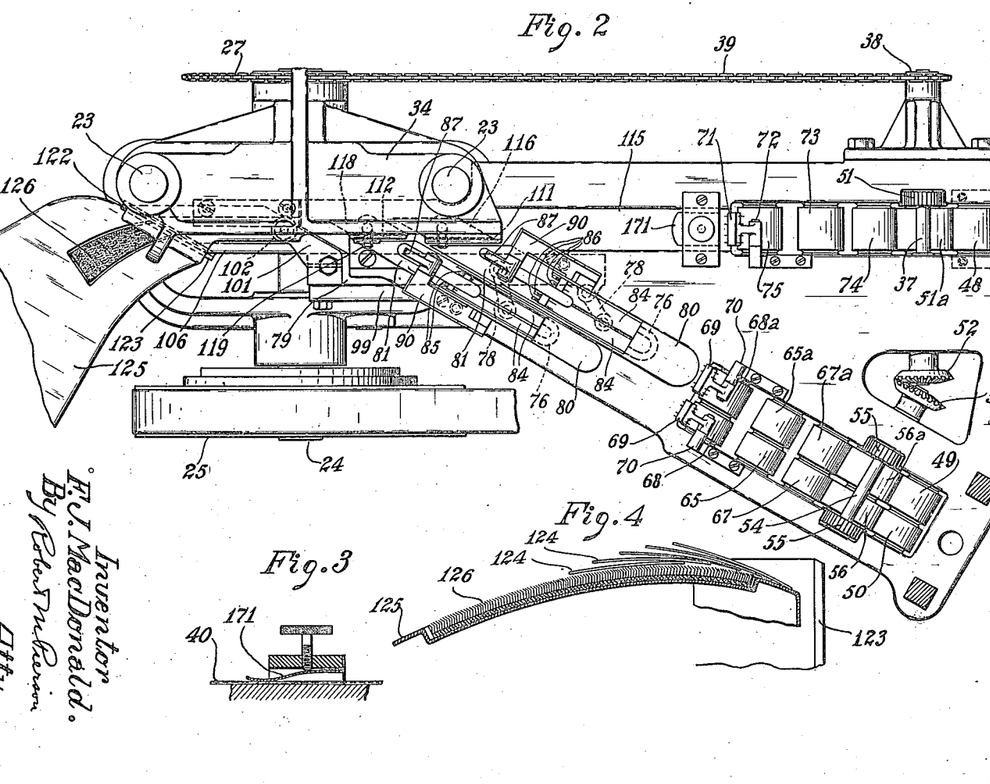
Fig. 2 is a plan view thereof.
Fig. 3 is a detail longitudinal section showing a presser-spring for the foundation strip.
Fig. 4 is a longitudinal section of the table for receiving the finished severed units or patches.
Figures 5, 6, 7:
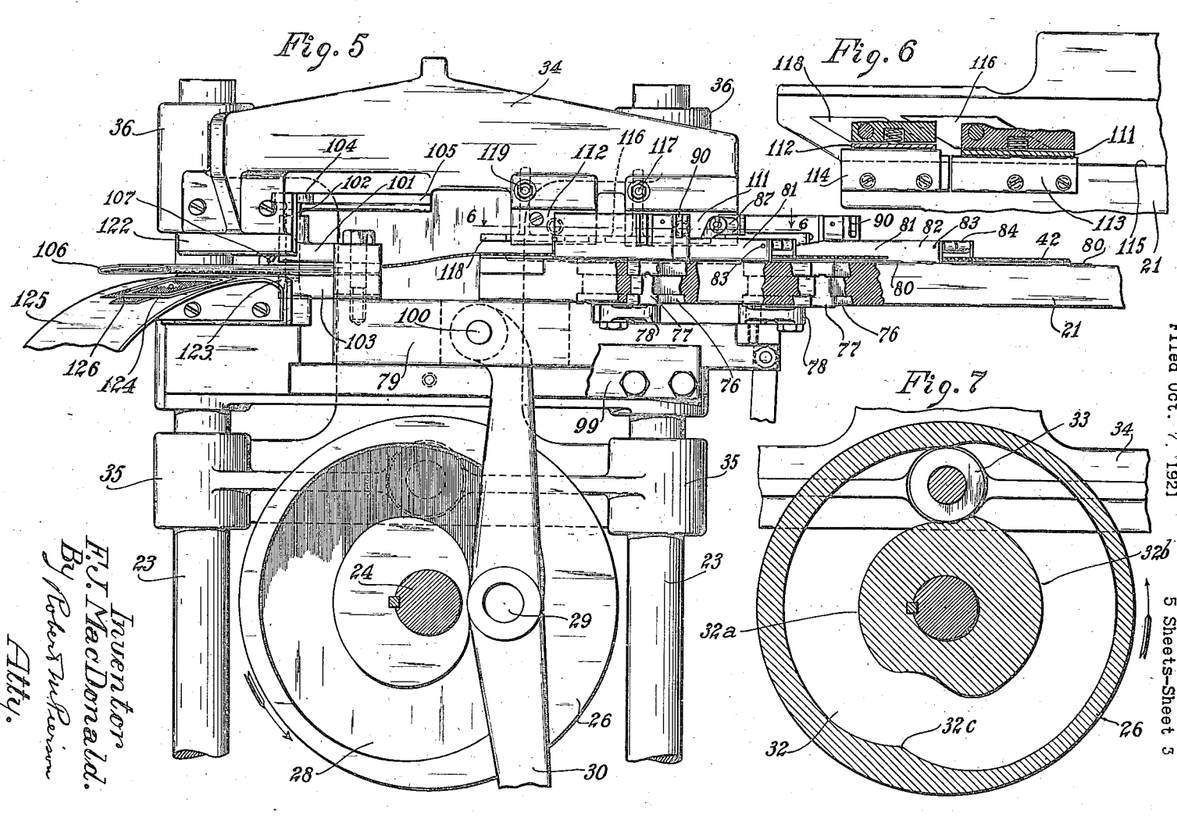
Fig. 5 is a side elevation of the left-hand end of the machine, partly broken away and in section.
Fig. 6 is a horizontal fragmentary section on the line 6—6 of Fig. 5.
Fig. 7 is a vertical section of the cam-wheel showing the rear cam for operating the cross-head.

The cut off patches fall upon a convex receiving table 125, which has a curvilinear shape as viewed from above, to follow the natural path of the string of delivered patches, the anterior portion of this table being covered with an inset piece of card clothing 126, the points of whose needles are slanted forwardly in the direction of feed so as to counteract any backward frictional drag of the strip-guide 106 during the rearward stroke of the latter. The forward stroke of said strip-guide carries the end of the plied strip which is about to be cut off over the card clothing 126 or the patch previously cut off so that the patches are overlapped like shingles, adhering lightly to each other, and a string of patches is formed as indicated in Fig. 4, the feeding of which is produced automatically by the action of the strip-guide 106 striking at an acute angle the upper surface of the last severed patch, and may, if desired, be assisted by hand.

Operation.

Briefly recapitulating the operation as indicated above, a foundation strip of rubberized fabric is supplied from the roll 43 and the two diagonally-fed strips are supplied from the rolls 44, 45. These strips respectively pass over the first guide-roll 48, 49 or 50, the diagonal strips 41, 42 pass under the propelling rollers 56 mounted on the rockers 59, and from thence between the idle-rollers 67, 68 in a loop embracing the feeler-roller 65, and from the roller 68 to the reciprocating feeders. The foundation strip takes a similar course under the propelling roller 51ª similar to 56 and from thence in a loop between the idle-rollers 74, 75, said loop embracing the feeler-roller 73 corresponding to 65. The strips 41 and 42 are intermittently fed forward simultaneously, side by side, by the forward movement of the slides 77 carrying the feed-pawls 84, said movement being produced, through the links 78, by the forward feeding movement of the slide 79, and should either of the strip-guides 81 in its return movement cause a wrinkle such as 98 (Fig. 14) or encounter a similar obstruction in either strip, the rearward thrust of the corresponding check-pawl 87 on its block 90 will release the latch-plate 96 from the lip of the keeper 97 and allow the pawl, assisted by the spring 95, to throw the block upwardly and disable the pawl 87, thereby avoiding tearing of the fabric strip. In that event, the strip will simply move back and forth with the slide and the dropping of the feeler-roller 65, by reason of the continued forward propulsion of the strip by the roller 56, will cause the arm 63, acting against the pin 62, to rock the lever 59 against its spring 61 and throw the gear 58 out of mesh with the driving gear 55, thereby suspending the further propulsion of the strip until the operator can straighten the strip and restore the check-pawl 87 to its operative position shown in Figs. 12 and 13, so that the strip feed is resumed. If the feed of the foundation-strip 40 by the leftward movement of the punch 102 should become interrupted, a corresponding automatic disablement of the propelling roller for that strip will occur.

In another mode of operation the spring 61 is so adjusted that the weight of the roller 65, lever 63, etc., is not sufficient completely to unmesh the gears 55, 58, and in case the intermittent feeding of the forward part of the strip is stopped or becomes relatively slow, said spring, by supporting said weight, relieves the tension of the strip, with the result that the propelling roller slips within the loop of the strip and does not drive the latter until the intermittent feeder has again tightened the strip about said propelling roller.

The forward feeding of the three fabric strips occurs simultaneously while the cross-head 34 is in a partly elevated position produced by a dwell 32ª on the cam-wheel 26 which raises the several knives above the foundation strip, but allows the punch 102 to remain in the hole which it has formed in the plied strip in order to cause the feed of said strip. By the forward movement of the slide 79, and with it the slides 77, the projecting ends of the diagonal strips 41, 42 are carried under the knives 111, 112 to the positions represented in Fig. 10, the end of the strip 41 directly overlying the foundation strip 40, and the end of the strip 42 overlying it in the next advanced position, so as partly to cover the lozenge-shaped piece 120 which has previously been cut off from the strip 41, the foundation-strip having been stepped ahead by the punch a distance equal to the spacing of the strips 41, 42. The cross-head is now elevated to its highest position by an outer dwell 32ᵇ on the cam-wheel, so as to withdraw the punch from the work, and the highest part of the cam groove 28 on said wheel then operates to retract the slides 79 and 77 to the rear ends of their strokes, the strips being held in their forward positions by the check-pawls 87 and 107, and the strip-guides 81 and 106 meanwhile slipping back over the strips. When the slides have finished their backward strokes, a low part 32ᶜ in the cam-groove 32 depresses the crosshead 34, thus causing the knives 111, 112 coacting with the fixed blades 113, 114 to shear off the ends of the strips 40, 41, leaving lozenge-shaped pieces 120, 121 on the foundation-strip as indicated in the next positions in Fig. 10, the shearing lines being indicated at 120ᵃ and 121ᵃ. The presser feet 116, 118 descending upon these pieces cause the tacky fabric plies to adhere firmly together. At the same time, the punch 102 perforates the plied unit 124ᵃ at the position 102ᵃ in Fig. 10 and simultaneously therewith the descending knife 122, acting in conjunction with the fixed blade 123, shears off the foremost plied unit at the line 124ᵇ in Fig. 10, leaving on the receiving table 125 the completed valve patch 124. The next forward reciprocation of the slides repeats the strip-feeding movements and also causes the strip-guide 106 to push forward the patch or string of overlapped patches previously deposited on the receiving table 125, the pawl action of the needles on the card clothing 126 tending to prevent retraction of the parts during the ensuing retraction of said strip-guide.

It will be understood that my invention is susceptible of wide modification in its specific embodiment.

I claim:

1. The method of making laminated pieces which comprises longitudinally feeding a foundation-strip of sheet material in successive, measured movements, transversely feeding thereon a second strip of sheet material in successive, measured movements, cutting said second strip into pieces distributed along the foundation-strip, such feeding and cutting being so timed as to cause said pieces to be of determinate size and to be placed in determinate positions upon said foundation strip, adhesively securing said pieces to said foundation strip and thereafter cutting apart said foundation-strip between the pieces.

2. The method of making laminated pieces which comprises longitudinally feeding a foundation-strip of sheet material in successive, measured movements, transversely feeding thereon, in successive, measured movements, a plurality of other strips of sheet material at points spaced longitudinally of the foundation-strip to build a plurality of laminations on the latter, cutting off the end portions of the transverse strips thus placed upon the foundation-strip, such feeding and cutting being so timed as to cause said pieces to be of determinate size and to lie in determinate relation to each other and to said foundation strip, adhesively securing said laminations together, and thereafter cutting apart the foundation-strip between the pieces.

3. The method of making laminated pieces which comprises longitudinally feeding a foundation-strip of sheet material, diagonally feeding a second strip of sheet material onto said foundation-strip, cutting off and adhesively securing the end portion of the latter to the foundation-strip along a line substantially parallel to the side edges of the latter, and cutting the foundation-strip apart between the overlaid pieces on lines substantially parallel to the direction of feed of the latter to form lozenge-shaped, laminated pieces.

4. The method of making laminated pieces which comprises longitudinally feeding a strip of adhesive sheet material, diagonally feeding thereon, in parallel, at successive points, a plurality of additional adhesive strips of sheet material, cutting off said diagonally-fed strips parallel to the feed of the foundation-strip to form spaced pieces in a plurality of layers on said foundation-strip, and successively cutting off the end of the foundation-strip between the pieces on lines parallel to the feed of said additional strips to form lozenge-shaped pieces of at least three plies of material.

5. In a machine of the character described, the combination of means for longitudinally feeding a foundation-strip of sheet material, means for transversely feeding thereon the end of a second strip of sheet material, means for successively cutting off said end to leave a series of pieces overlying the foundation-strip, and means for pressing said pieces onto the foundation-strip.

6. In a machine of the character described, the combination of means for longitudinally feeding a foundation strip of sheet material, means for transversely feeding thereon the end of a second strip of sheet material, means for successively cutting off said end to leave a series of pieces overlying the foundation-strip, and means for successively cutting off the end of the foundation-strip between said pieces.

7. In a machine of the character described, the combination of means for longitudinally feeding a foundation-strip of sheet material, means for transversely feeding thereon, in parallel, the ends of a plurality of additional strips of sheet material at successive points, means for cutting off said ends to leave spaced pieces in a plurality of plies on the foundation-strip, and means for successively cutting off the end of the foundation-strip between said pieces.

8. In a machine of the character described, the combination of means for longitudinally feeding a foundation-strip of sheet material, means for diagonally feeding thereon a second strip of sheet material, means for successively cutting off the end of said second strip parallel to the feed of the foundation-strip to leave spaced pieces thereon, and means for successively cutting off the end of the foundation-strip between the pieces parallel to the feed of the second strip to make laminated lozenge-shaped pieces.

9. In a machine of the character described, the combination of means for longitudinally feeding a foundation-strip of sheet material, means for diagonally feeding thereon, side by side, a plurality of other strips of sheet material, and means for successively cutting off the ends of said other strips.

10. In a machine of the character described, the combination of means for longitudinally feeding a foundation-strip of sheet material, means for diagonally feeding thereon, side by side, a plurality of other strips of sheet material, means for successively cutting off the ends of said other strips on the bias, and means for pressing the cut-off pieces upon said foundation-strip.

11. In a machine of the character described, the combination of means for longitudinally feeding a foundation-strip of sheet material, means for diagonally feeding thereon, in parallel, side by side, a plurality of other strips of sheet material, means for successively cutting off the ends of said other strips on the bias and pressing them down to build up successive, laminated units, and means for successively cutting off the end of said foundation-strip on the bias between the units.

12. In a machine of the character described, the combination of means for supplying a foundation-strip of sheet material, means for transversely feeding thereon, side by side, the ends of a plurality of other strips of sheet material, means for successively cutting off said ends to leave spaced pieces on the foundation-strip, and means for intermittently advancing said foundation-strip by steps equal to the spacing of said pieces.

13. In a machine of the character described, the combination of means for supplying a strip of sheet material, means for guiding transversely thereon the end of a second strip of sheet material, means for successively cutting off said end, a propelling roller for one of said strips, rollers adapted to guide said strip in a loop embracing said propelling roller, and an intermittent feeder for said strip located posterior of said propelling roller.

14. In a machine of the character described, the combination of means for supplying a strip of sheet material, means for guiding transversely thereon the end of a second strip of sheet material, means for successively cutting off said end, propelling means for one of said strips, an intermittent feeder for said strip located posterior to said propelling means, and means responsive to the tension on the strip for automatically disabling said propelling means when it advances the strip at a greater rate than said feeding means.

15. In a machine of the character described, the combination of strip-guiding means, an intermittent strip feeder, a strip-propelling roller anterior thereto, a pair of gears for driving said roller, and a feeler adapted to occupy a loop of the strip between said roller and feeder for automatically unmeshing said gears when the rate of feed of the roller exceeds that of the feeder.

16. In a machine of the character described, the combination of strip-guiding means, a strip feeder, a strip-propelling roller having a gear, a complemental gear for driving the latter, a rocker carrying said roller and the first said gear and biased to hold the gears in mesh, a feeler-roller adapted to be suspended in a loop of the strip between said roller and feeder, and a pivoted arm attached to said feeler-roller and controlling said rocker for unmeshing said gears when the loop elongates beyond a predetermined point.

17. In a machine of the character described, the combination of a reciprocating strip-feeder, a pawl normally preventing the retraction of the strip during the return stroke of said feeder, and means responsive to an abnormal backward pull on the strip for disabling said pawl.

18. In a machine of the character described, the combination of a reciprocating slide having one-way acting strip-feeding means, a pawl normally preventing the retraction of the strip during the return stroke of said slide, a fixed keeper, and a pivoted latch-slide pivotally connected with said pawl and normally held by said keeper in a pawl-projecting position, said slide being disengageable from the keeper by an abnormal rearward pull on the strip exerted through the pawl.

19. In a machine of the character described, the combination of means for guiding a foundation strip of sheet material, means for transversely feeding thereon the end of a second strip of sheet material, a knife adapted to sever said end, a knife-holder, and a presser-foot carried by said knife-holder for pressing the end of the second strip onto the foundation strip.

20. In a machine of the character described, the combination of means for guiding a foundation strip of sheet material, means for diagonally feeding thereon the end of a second strip of sheet material, a bias-cutting knife adapted to sever said end on a line substantially parallel to the direction of movement of the foundation strip, a knife-holder, and a presser-foot carried by said holder and adapted to press the severed end against the foundation strip.

21. In a machine of the character described, the combination of means for longitudinally guiding a strip of sheet material, a punch for successively perforating said strip near the end thereof, means for reciprocating said punch to feed the strip by engagement of the punch in the hole cut thereby, and means for successively cutting off the punched end of the strip.

22. In a machine of the character described, the combination of means for longitudinally guiding a foundation strip of sheet material, means for applying pieces of sheet material at predetermined intervals to said foundation strip to form a connected series of laminated units, a punch for successively perforating said units, and means for reciprocating said punch to feed the plied strip longitudinally.

23. In a machine of the character described, the combination of means for longitudinally guiding a foundation strip of sheet material, means for transversely feeding thereon, side by side, a plurality of other strips of sheet material to form a connected series of laminated units of at least three plies, a punch for successively perforating the laminated units, means for imparting to said punch while in the plied strip a feeding movement equal to the spacing of the units, and means for successively cutting off the laminated units.

24. In a machine of the character described, the combination of means for intermittently feeding a strip of sheet material, means for successively cutting off the end of said strip, and means comprising stationary card clothing for receiving the cut-off ends in overlapped relation and causing a string of said overlapped units to be intermittently fed by the addition thereto of successive cut-off ends.

25. In a machine of the character described, the combination of means including a channeled slide for guiding and feeding the advance end of a strip of sheet material, means for reciprocating said slide, means for preventing the retraction of said strip during the return movement of the slide, means for cutting off the end of the strip projecting from said slide, and a receiving table located posterior to the cutting means and extending under the end of the slide when the latter is advanced, said table being provided with a series of forwardly-slanted needles.

In witness whereof I have hereunto set my hand this 3rd day of October, 1921.

FRANK J. MacDONALD.